(12) United States Patent
Rasheed et al.

(10) Patent No.: US 8,612,753 B2
(45) Date of Patent: Dec. 17, 2013

(54) METHOD AND APPARATUS FOR PROTECTED CODE EXECUTION ON CLIENTS

(75) Inventors: Yasser Rasheed, Beaverton, OR (US); Steve Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1181 days.

(21) Appl. No.: 12/343,148

(22) Filed: Dec. 23, 2008

(65) Prior Publication Data
US 2010/0161956 A1    Jun. 24, 2010

(51) Int. Cl.
*H04L 29/06* (2006.01)
*G06F 11/30* (2006.01)
*G06F 12/14* (2006.01)
*G06F 15/173* (2006.01)

(52) U.S. Cl.
USPC .......... 713/164; 713/150; 713/167; 713/189; 713/192; 713/193; 718/101; 709/203; 709/223; 709/226

(58) Field of Classification Search
USPC ......... 713/150, 151, 152, 175, 168, 164–167, 713/189, 192–194; 709/201–203, 223–226, 709/229; 726/27; 718/100–104
See application file for complete search history.

(56) References Cited

U.S. PATENT DOCUMENTS

| | | | |
|---|---|---|---|
| 7,571,227 B1 * | 8/2009 | Pabla | 709/224 |
| 7,984,095 B2 * | 7/2011 | Keohane et al. | 709/201 |
| 8,150,904 B2 * | 4/2012 | Queck et al. | 709/201 |
| 8,201,184 B2 * | 6/2012 | Thies et al. | 718/106 |
| 2004/0068729 A1 * | 4/2004 | Simon et al. | 718/102 |
| 2005/0005014 A1 * | 1/2005 | Holmes et al. | 709/227 |
| 2005/0216736 A1 * | 9/2005 | Smith | 713/168 |
| 2005/0273511 A1 * | 12/2005 | Ferreira de Andrade et al. | 709/227 |
| 2007/0028098 A1 * | 2/2007 | Baartman et al. | 713/162 |
| 2007/0250365 A1 * | 10/2007 | Chakrabarti et al. | 705/8 |
| 2008/0130893 A1 * | 6/2008 | Ibrahim et al. | 380/277 |
| 2009/0019285 A1 * | 1/2009 | Chen et al. | 713/175 |
| 2009/0300348 A1 * | 12/2009 | Aciicmez et al. | 713/156 |

OTHER PUBLICATIONS

Credentials session, Conference on Computer and Communications Security, Proceedings of the 11$^{th}$ ACM Conference on Computer and Communications Security, Washington, D.C., pp. 132-145, ISBN: 1-58113-961-6 (2004).

* cited by examiner

*Primary Examiner* — Tae Kim
(74) *Attorney, Agent, or Firm* — Trop, Pruner & Hu, P.C.

(57) ABSTRACT

In one embodiment of the invention, a server may send encrypted material to a client. The client processor may decrypt and process the material, encrypt the results, and send the results back to the server. This sequence of events may occur while the execution or processing of the material is restricted to the client processor. Any material outside the client processor, such as material located in system memory, will be encrypted.

20 Claims, 3 Drawing Sheets

METHOD AND APPARATUS FOR PROTECTED CODE EXECUTION ON CLIENTS

BACKGROUND

In areas of technology such as Software as a Service (SaaS) and grid computing, numerous client machines may be asked to download or stream an application or applications from a server, execute code, and return data to the server for archiving and/or additional processing. However, while the majority of clients may have no malicious intent, if even a small number of clients are intentionally malicious or infected with malicious agents the impact can be detrimental to the organizations involved in the computing effort. For example, if a pharmaceutical company is using a distributed client base for a pharmaceutical simulation part of the distributed computing process may include sending sensitive material (e.g., code, data, and other information) to distributed client compute nodes. A compromised client may give undesirable parties access to this sensitive data. Additionally, a compromised client may tamper with the data and calculations thereby causing a negative impact on the pharmaceutical company's product development. Thus, sensitive materials may be compromised by malicious and/or malfunctioning applications and devices on the client computing platform.

BRIEF DESCRIPTION OF THE DRAWINGS

The accompanying drawings, incorporated in and constituting a part of this specification, illustrate one or more implementations consistent with the principles of embodiments of the invention and, together with the following description of the embodiments, explain such implementations. The drawings are not necessarily to scale, the emphasis instead being placed upon illustrating the principles of embodiments of the invention. In the drawings.

DETAILED DESCRIPTION

The following description refers to the accompanying drawings. Among the various drawings the same reference numbers may be used to identify the same or similar elements. While the following description provides a thorough understanding of various aspects of embodiments of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of embodiments of the invention claimed may be practiced in other examples or implementations that depart from these specific details. At certain junctures in the following disclosure, descriptions of well known devices, circuits, and methods have been omitted to avoid clouding the description of various embodiments of the invention with unnecessary detail.

Figure 1:
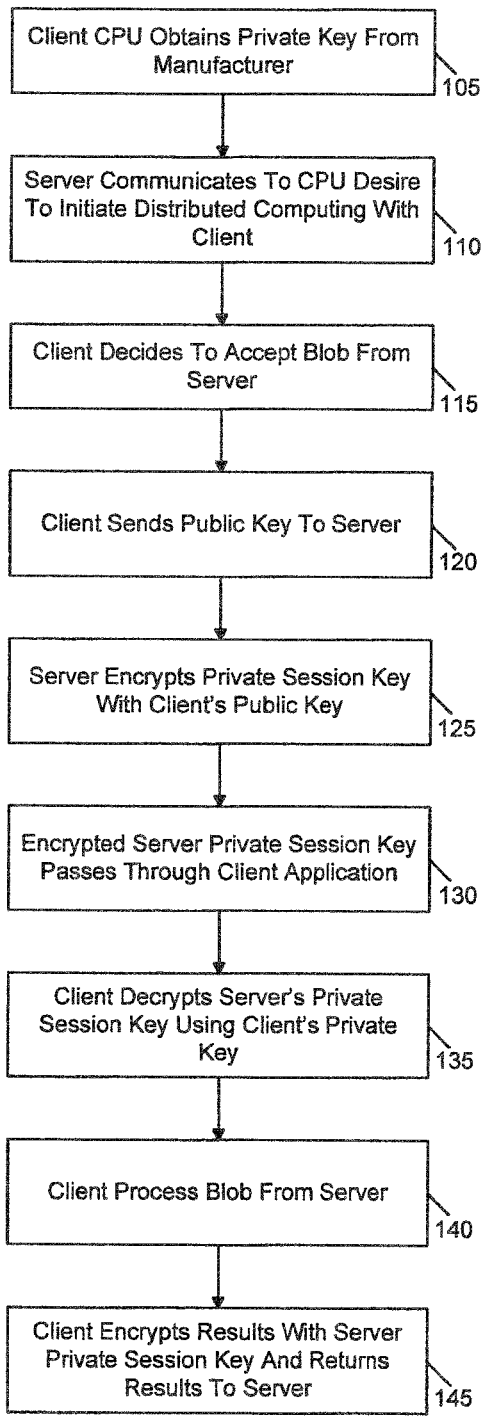
FIG. 1 is a block diagram of a method according to one embodiment of the invention.

FIG. 1 is a block diagram of a method 100 according to one embodiment of the invention. In block 105, a processor (Client1 processor), such as a central processor unit (CPU), included in a client device or environment (Client1) may include a private key. Client1 may communicate with a server (Server1) or similar apparatus or system. Server1 and Client1 processor may use various forms of cryptography to protect sensitive information transferred or communicated between Server1 and Client1 processor. Server1 and Client1 processor may use, for example, symmetric-key systems that use a single key that both the sender and recipient have and/or public-key systems that use two or more keys, such as a public key known to multiple parties and a private key that only the recipient of messages uses. Still referring to block 105, Client1 processor may include a private key that is part of a public-key system. The CPU's private key may be unique to the processor and may be obtained from, for example, a device manufacturer (e.g., Intel Corporation).

In one embodiment of the invention, Client1 processor may include a direct anonymous attestation (DAA) private key based on public-key encryption. DAA may use a single public key for many unique private keys. Thus, there is no "master" private key. As a result, the security of Server1/Client1 communications and privacy of client1 may be increased. Of course, the invention is not limited to using DAA and may instead, for example, include a single private key in a series of client CPUs that cooperate with a published public key. Specifically, a manufacturer may embed a master private key in the Client1 CPU, while publishing the public key. This format may streamline negotiations between Client1 and Server1, which may be desirable in certain situations. In other words, embodiments of the invention are not limited to any one security protocol or measure and may use any number of techniques such as DAA or various forms of public key infrastructure (PKI) schemes.

In block 110, Server1 may communicate to Client1 its desire to initiate, for example, distributed computing with Client1 by initiating a key exchange process with Client1 processor. To do so, Server1 may transfer materials such as a message, job, or binary large object (BLOB) to Client1 processor. A BLOB may be many things, including a collection of binary data stored as a single entity. A BLOB may include multimedia objects, data, programs or even fragments of code. In one embodiment of the invention, Server1 may attach a digital certificate to the BLOB. The digital certificate may verify that Server1 is indeed Server1, and provide Client1 processor with the means to encode a reply. For example, the digital certificate may be encrypted and contain Server1's public key as well as a variety of other identification information (e.g., name of Server1). The certificate may be digitally signed by a certificate authority (CA) that issued the certificate. The certificate may be based on a certificate standard such as X.509. The above may all be done in accordance with PKI schemes or the like (e.g., web of trust).

In block 115, Client1 may decide whether to accept a job or the like, possibly included in or associated with the BLOB, from Server1. To do so, in one embodiment of the invention Client1 is first able to determine if it trusts Server1 to submit a workload for Client1 to process. For example, Client1 may use the CA's published public key to decode the digital certificate, verify the certificate as issued by the CA, and obtain Server1's public key and identification information held within the certificate. Based on this information, Client1 may determine whether to accept the BLOB from Server1.

In some embodiments of the invention, Client1 may determine whether to accept the job from Server1 based on still other information. For example, such information may be included in the BLOB and may address what resources from Client1 will be used in processing the BLOB and to what magnitude they will be used. This information may be further useful for accounting purposes wherein Client1 may even bill Server1 based on Server1's use of Client1 resources.

In block 120, assuming Client1 has decided to accept the job from Server1, Client1 processor may send its public key to Server1. For example, Client1 processor may generate a new key (NK) using a cryptographic engine included in Client1 processor or CPU. In other words, for any specific transaction the embedded CPU may negotiate a session key with the server. NK may be a public-private key pair based on, for example, a public-key system such as a Diffie-Hellman or Rivest, Shamir, and Adelman (RSA) public-private key pair. Client1 processor may form a digital certificate identifying Client1 and including the NK public key corresponding to Client1 CPU's unique private key. The certificate may be signed with Client1 CPU's private key, thereby allowing the external entity (e.g., Server1) to validate the certificate using the NK public key. This may prevent tampering by an untrustable client.

Furthermore, in one embodiment of the invention the certificate may include information based on the DAA characteristics of Client1, thereby providing assurance to Server1 of Client1's identity without necessarily specifically identifying Client1 (e.g., using a trusted group signature associated with DAA). DAA may require that the CPU has a unique DAA private key and that the server obtain a corresponding DAA certificate with the associated DAA public key. The DAA protocol may protect Client1's privacy so that Client1 may communicate with Server1 multiple times without Server1 knowing whether it has previously communicated with Client1.

In addition, in one embodiment of the invention Client1's acceptance of Server1's job may be a conditional acceptance. For example, Client1 may limit processing of the job to certain Client1 resources (e.g., Client1's CPU and cache but not Client1's system memory). As another example, Client 1 may conditionally allow execution of the job when Client1 CPU is in HLT or Cx states (i.e., not fully engaged in productive actions for the host environment). Server1 may then determine whether to accept Client1's conditional acceptance.

In block 125, Server1 may encrypt a private session key with Client1 processor's public key. For example, Server1 received, via a Client1 application, the signed certificate containing Client1 CPU's NK (e.g., DAA based public key). After receiving the signed certificate Server1 may verify the NK and certificate are for an embedded CPU with cryptographic capability and that the CPU originated from a trusted manufacturer. Server1 may accept the NK as a valid key for subsequent communication, assuming Server1 now trusts Client1. Server1 may then generate a symmetric-key system-based session key (SK), encrypt the SK with Client1 processor's public NK, and send the encrypted SK to Client1 CPU via the Client1 application. The SK may allow for simpler and faster communications between Client1 processor and Server1, while the SK was properly secured using the NK. The SK may be based on, for example, the Data Encryption Standard (DES) or Advanced Encryption Standard (AES).

In block 130, Server1 may transmit the encrypted SK through a Client1 application. A Client 1 application may be, for example, an agent that runs on host Client1 and facilitates communication/interfacing to the trusted Client1 CPU. Host Client1 may freely run this agent since a "benevolent" user may want to facilitate the distributed processing capability even though the host is shielded from seeing the data. The application may operate similarly to an internet service provider (ISP) passing data between a browser and bank server even though the ISP cannot "see" the data that is encrypted with SSL technology. As another example, host software on Client1 may act as a conduit for a payload (e.g., Blob). Use of certain technology, such as Intel Corporation's Active Management Technology, may allow communication of the payload to the Client1 platform independent of the Client1 host software stack. As yet another example, a payload may be received by Client1 processor via another out-of-band component or mechanism such as, for example, a manageability controller and firmware stack that bypasses the host. Thus, because the encryption/decryption engine is included in Client1 CPU in one embodiment of the invention, and not elsewhere in Client1, communications between Server1 and Client1 are never "in the open" (i.e., unencrypted) on Client1 except for within Client1 CPU. Thus, because the Client1 application does not include the NK private key to decrypt the transmitted SK, the SK is "passed through" the application and to Client1 CPU where it can be decrypted in a protected environment. For example, the SK may be passed through Client1's host software environment or other out of band mechanism (e.g., manageability controller and firmware stack).

In block 135, Client1 processor decrypts Server1's private SK using Client1 processor's private NK and cryptographic engine, both included Client1 CPU. Thus, Client1 CPU "unwraps" the SK and now a Server1 application and Client1 CPU have a common key SK.

In block 140, Client1 CPU processes the job and/or BLOB. In step 145, Client1 CPU encrypts the results with Server1's private SK and returns the results to Server1. A new SK may be generated for every session between Client1 processor and Server1. In an embodiment of the invention, Server1 may ensure results from Client1 CPU have not been tampered with. For example, if the results are tampered with before arriving at Server1, a digital signature from Client1 CPU may expose the tampering. At that point, Server1 may reject the job.

Unlike conventional methods of trusted computing, in various embodiments of the invention Client1 applications never see an "unwrapped" BLOB or related results because only Client1 processor (e.g., CPU) includes the necessary cryptographic engine and SK private key. Conventional software-based mechanisms, such as "sandboxing", may be insufficient in this regard. For example, sandboxing may include a set of rules used when creating an applet wherein the rules prevent certain functions when the applet is sent as part of a Web page. If the applet is allowed unlimited access to memory and operating system resources, it may do harm in the hands of someone with malicious intent. The sandbox may attempt to create an environment in which there are strict limitations on what system resources the applet can request or access. However, sandboxing and similar techniques may be limited in their ability to secure transferred code since they may be subject to software-based attacks (e.g., running virtual software to monitor other system elements or running one software application to monitor another application). Also, these methods may allow information to be stored on system memory "in the clear" (i.e., unencrypted). This may be avoided in various embodiments of the invention because Client1 CPU includes the encryption/decryption engine and keys so unencrypted information is never stored in system memory. As a result, embodiments of the invention may protect material being executed or processed from the host it is executing on but still enable the host to determine if such execution should be permitted. The remote computing node is thus controlled to an acceptable security level while still allowing the server and node to evaluate one another as well as the perspective job.

Thus, various embodiments of the invention allow a server to encrypt code and data it may send to a client. The client's processor (e.g., CPU) may then decrypt the code/data content, execute the code, encrypt the results, and send the results back to the server. This sequence of events may occur while the execution or processing of code/data is restricted to the client CPU, which may be a trusted processing engine. Any code/data outside the client CPU (e.g., located in system memory) is always encrypted. For example, in one embodiment of the invention, when Client1 CPU is internally executing code for secure functions, its internal logic may dictate policy that all reads/writes from RAM must be sealed and signed. In some embodiments of the invention, resources outside the CPU or processor may be utilized to process the job, but such resources would do so while only seeing encrypted data/code. Such services may ensure such data/code/information is not tampered with using, for example, digital signature or hash technology.

Also, in various embodiments of the invention some results from Client1 CPU may exit the CPU unencrypted. Such unencrypted data may include, for example, usage statistics (e.g., what resources were used and for long were they used) that can serve accounting and billing purposes.

Figure 2:
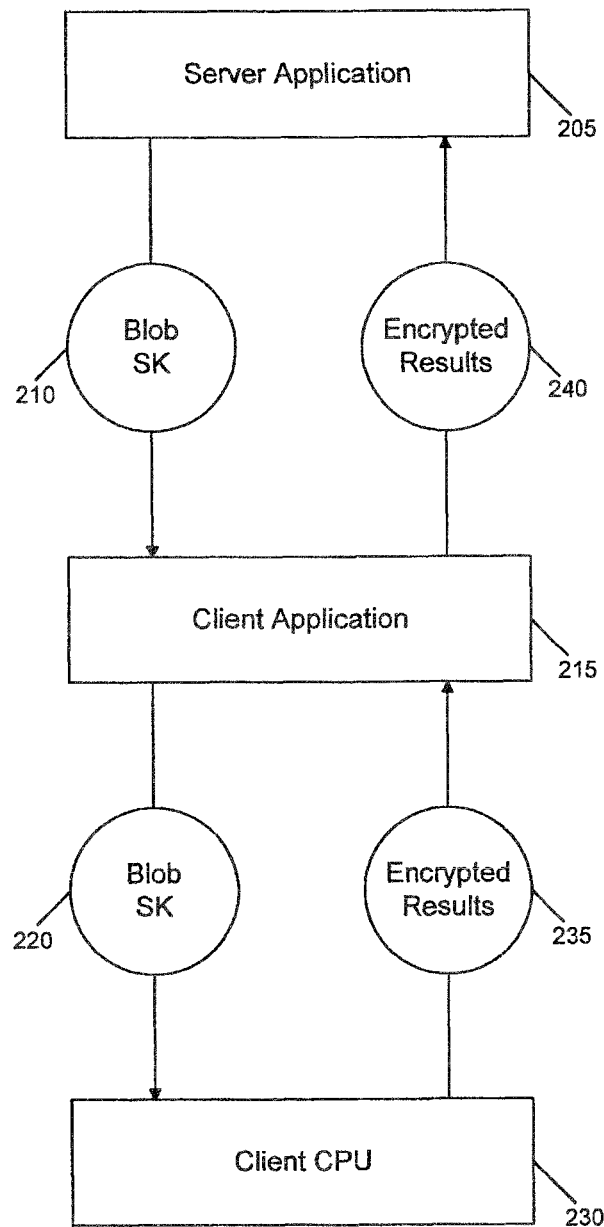
FIG. 2 is a block diagram of a method according to one embodiment of the invention.

FIG. 2 is a block diagram of a method 200 according to one embodiment of the invention. In block 205, after the server and client processor exchange key information as described above, for example, the server application may generate a session key (SK). In block 210, the server may create and forward a remote execution BLOB, along with the SK, to the client processor. The BLOB may contain materials such as data, code, and other information. The BLOB may be encrypted with the SK and signed by the server application. In block 215, the client application may verify the server signature and forward the still-encrypted BLOB to the client processor for execution. In block 230, the client processor may decrypt and execute the BLOB and then encrypt the output data with the SK. In blocks 235 and 240, the encrypted results may be passed through the client application and to the server application.

In light of the above, it should be evident that in various embodiments of the invention portion of the client (e.g., system memory) cannot "see" the content of the code or data that it is executing, the client cannot interfere or tamper with the job received from the server, and the results are re-sealed such that only the initiating service (e.g., Server1) can see the results. Still, the client is also able to determine if it trusts a server to submit a workload for the client processor to process even though the client is unable to monitor or tamper with execution of the workload. Furthermore, the server has a high degree of assurance that portions of the client (e.g., system memory) has not seen the source code, data or results, and that the job actually executed as directed to completion. Also, there is an assurance of tamper resistance, including tampering from software based attacks and hardware-based attacks (e.g., system bus snooping). Additionally, the client platform can determine which servers/capabilities are "allowed" to submit a workload (even though the client platform has no knowledge of the actual execution and is essentially processing a "black box" or unknown job). As a result, embodiments of the invention provide assurances and support for, as an example, high performance grid computing and SaaS software development models that may be performed by distributed (and potentially un-trusted) compute nodes. For example, since SaaS allows an application to be hosted as a service provided to customers across the Internet, security is paramount for such an application.

In one embodiment of the invention, a DAA (or static) key may be set at manufacture time. For example, with DAA technology a random key may be generated in a secure facility (e.g., factory) and signed with a "master" key. The signed public key (i.e., certificate) may be loaded into the CPU and freely extracted. The private half of the key may also be stored in the CPU as, for example, a set of "fuses" (one bit literally fused/burned) or written to NVRAM or ROM (engraved in the silicon die) in the CPU package. Once the private key is stored, the private key may be removed from the manufacturing equipment.

Figure 3:
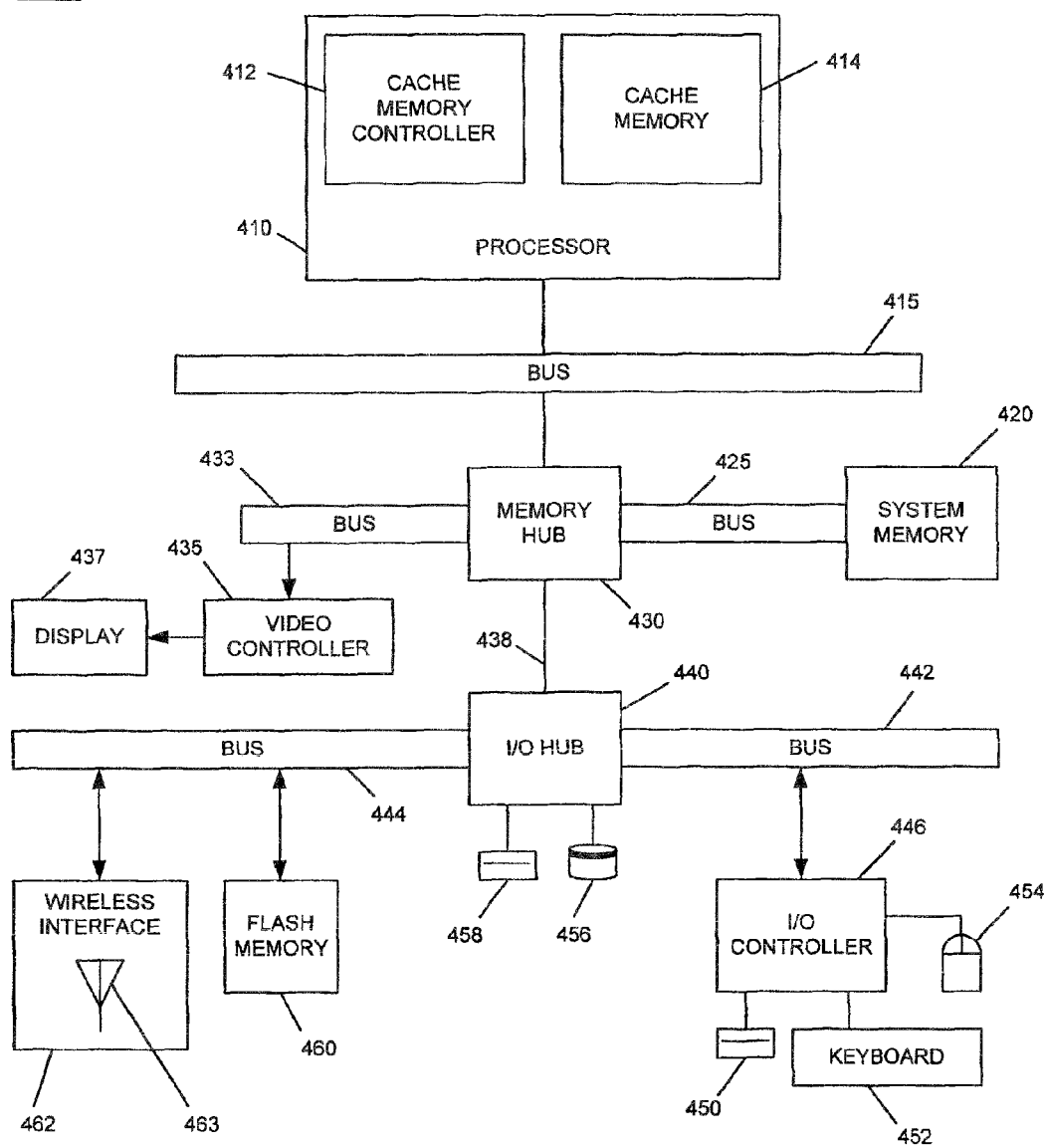
FIG. 3 is a system block diagram according to one embodiment of the invention.

While the functions herein may be described as being carried out by a particular structure, several components, including the memory controller, operating system, BIOS, run-time software, application software, hardware, firmware, or any combination thereof, may carry out the functions herein without detracting from the scope of the present invention. FIG. 3 is a system block diagram for use with one embodiment of the invention. Computer system 400, which may be a client or server, includes a processor 410, which may include a general-purpose or special-purpose processor such as a microprocessor, microcontroller, a programmable gate array (PGA), graphics processing units (GPU), embedded management controllers, and the like. Processor 410 may include a cache memory controller 412 and a cache memory 414. Processor embodiments may include single or multiple cores and may be a multiprocessor system with multiple processors 410. Processor 410 may be coupled over a host bus 415 to a memory hub 430, which may be coupled to a system memory 420 (e.g., a DRAM) via a memory bus 425. Memory hub 430 may also be coupled over an Advanced Graphics Port (AGP) bus 433 to a video controller 435, which may be coupled to a display 437. Memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. I/O expansion bus 442 may be coupled to an I/O controller 446 that controls access to I/O device(s). These devices may include storage devices (e.g., disk drive 450) and input devices, such as a keyboard 452 and a mouse 454. I/O hub 440 may also be coupled to, for example, a hard disk drive 458 and a compact disc (CD) drive 456. Other storage media may be included in the system. PCI bus 444 may also be coupled to various components including, for example, a flash memory 460. A wireless interface 462 may be coupled to PCI bus 444, which may be used in certain embodiments to communicate wirelessly with remote devices. Wireless interface 462 may include a dipole or other antenna 463 (along with other components not shown). While such a wireless interface may vary in different embodiments, in certain embodiments the interface may be used to communicate via data packets with a wireless wide area network (WWAN), a wireless local area network (WLAN), a BLUETOOTH™, ultrawideband, a wireless personal area network (WPAN), or another wireless protocol. In various embodiments, wireless interface 462 may be coupled to system 400, which may be a notebook or other personal computer, client, server, cellular phone, personal digital assistant (PDA) or the like, via an external add-in card or an embedded device. In other embodiments wireless interface 462 may be fully integrated into a chipset of system 400. In one embodiment of the invention, a network controller (not shown) may be coupled to a network port (not shown) and the PCI bus 444. Additional devices may be coupled to the I/O expansion bus 442 and the PCI bus 444. Although the description makes reference to specific components of system 400, it is contemplated that numerous modifications and variations of the described and illustrated embodiments may be possible. Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   a client receiving encrypted material from a server and conditionally accepting processing a job based on a condition that processing the job will not exceed usage of a threshold level of resources of the client;
   a processor included in the client (a) decrypting the encrypted material to produce unencrypted material, (b) processing the unencrypted material to produce unencrypted results, (c) encrypting the unencrypted results to produce encrypted results, and (d) communicating the encrypted results to the server; and
   excluding the unencrypted material and the unencrypted results from storage in a system memory included in the client;
   wherein the conditionally accepting includes communicating a conditional acceptance to the server that includes at least one of (a) limiting resources for processing the job; and (b) limiting states when the processor will process the job.

2. The method of claim 1, further comprising communicating a key from the client to the server, wherein the key is based on a unique key included in the processor.

3. The method of claim 2, further comprising decrypting the encrypted material based on a symmetric key communicated from the server.

4. The method of claim 3, further comprising decrypting the symmetric key based on the unique key.

5. The method of claim 2, wherein the unique key is based on direct anonymous technology (DAA).

6. The method of claim 1, further comprising:
   the processor receiving the encrypted material from the server via an out-of-band component included in the client but not included in the processor;
   determining whether to produce the unencrypted results based on a decision from the out-of-band component; and
   excluding the unencrypted material and the unencrypted results from storage in any memory included in the client but not included in the processor.

7. The method of claim 1, further comprising determining whether to process the unencrypted material based on further determining an amount of resources required to process the unencrypted material.

8. The method of claim 1, further comprising evaluating a digital security identification of the server before decrypting the encrypted material.

9. The method of claim 1, further comprising transferring unencrypted accounting data to a resource coupled to the processor; wherein the accounting data is based on resources required to process the unencrypted material.

10. The method of claim 1, wherein the conditional acceptance may be rejected by the server.

11. An article comprising a non-transitory computer readable storage medium storing instructions that enable a processor-based client to:
    receive encrypted material from a computing node during a first session, the client and the computing node to each be included in a distributed computing network;
    conditionally accept processing a job based on a condition that processing the job will not exceed usage of a threshold level of resources of the client;
    evaluate a digital security identification of the computing node before decrypting the encrypted material;
    within a processor included in the client, (a) decrypt the encrypted material to produce unencrypted material, (b) process the unencrypted material to produce unencrypted results, (c) encrypt the unencrypted results to produce encrypted results, and (d) communicate the encrypted results to the computing node; and
    exclude the unencrypted results from storage in a memory included in the client but not included in the processor
    wherein to conditionally accept includes to communicate a conditional acceptance to the computing node that includes at least one of (a) a limitation of resources for processing the job; and (b) a limitation of states for when the processor will process the job.

12. The article of claim 11, further storing instructions that enable the processor to decrypt the encrypted material based on a symmetric key communicated from the computing node.

13. The article of claim 11, further storing instructions that enable the processor to determine whether to process the unencrypted material based on determining an amount of resources required to process the unencrypted material.

14. The article of claim 11, wherein the encrypted material includes a binary large object (blob) that further comprises the job.

15. An apparatus comprising:
    a memory to receive encrypted material from a computing node;
    a processor, coupled to the memory but not including the memory, to (a) decrypt the encrypted material, (b) process the unencrypted material to produce results, (c) encrypt the results to produce encrypted results, and (d) communicate the encrypted results to at least one of the computing node and an additional node;
    wherein the unencrypted results are to be excluded from storage in any memory included in the apparatus and outside the processor; and the apparatus is to conditionally accept processing the job by communicating a conditional acceptance, to at least one of the computing node and the additional node, that includes at least one of communicating (a) less than 100% of the apparatus' resources will be available for processing the unencrypted material; and (b) the apparatus' resources will be available for processing the unencrypted material only during a portion of available states for the processor.

16. The apparatus of claim 15, wherein the processor is to communicate a key to the computing node, the key to be based on a unique key included in the processor.

17. The apparatus of claim 15, wherein the processor is to decrypt the encrypted material based on a symmetric key to be communicated from the computing node.

18. The apparatus of claim 17, wherein the processor is to:
receive additional encrypted material from the computing node; and
decrypt the additional encrypted material based on an additional symmetric key to be received from the computing node;
wherein the symmetric key is to be unequal to the additional symmetric key.

19. The apparatus of 18, wherein the processor includes a unique key based on direct anonymous technology (DAA).

20. The apparatus of claim 15, wherein the encrypted material includes a binary large object (blob) that further comprises a job.

* * * * *